United States Patent
Fickling (10) Patent No.: US 11,578,489 B2
(45) Date of Patent: Feb. 14, 2023

(54) SOLID WOOD WALL SYSTEM (71) Applicant: Gary Fickling, Manning, SC (US)

(72) Inventor: Gary Fickling, Manning, SC (US)

(*) Notice: Subject to any disclaimer, the term of this patent is extended or adjusted under 35 U.S.C. 154(b) by 34 days.

(21) Appl. No.: 16/997,346

(22) Filed: Aug. 19, 2020

(65) Prior Publication Data
US 2022/0056693 A1 Feb. 24, 2022

(51) Int. Cl.
E04B 2/70 (2006.01)
E04C 2/52 (2006.01)
E04B 2/36 (2006.01)
E04B 2/02 (2006.01)

(52) U.S. Cl.
CPC ............... *E04C 2/525* (2013.01); *E04B 2/36* (2013.01); *E04B 2/702* (2013.01); *E04B 2002/0206* (2013.01)

(58) Field of Classification Search
CPC .... E04B 2002/0206; E04B 2/70; E04B 2/702; E04B 2/705; E04B 2/708
See application file for complete search history.

(56) References Cited

U.S. PATENT DOCUMENTS

| | | | |
|---|---|---|---|
| 2,040,110 A | 5/1936 | Tahvonen et al. | |
| 3,440,784 A | 4/1969 | Onjukka | |
| 3,969,859 A | 7/1976 | Hisey | |
| 4,047,350 A | 9/1977 | Chisum | |
| 4,168,675 A * | 9/1979 | Chisum | B23Q 11/0042 118/316 |
| 4,903,447 A | 2/1990 | McDade | |
| 5,400,845 A | 3/1995 | Choiniere et al. | |
| 5,890,332 A * | 4/1999 | Skidmore | E04B 2/08 52/271 |
| 6,023,895 A | 2/2000 | Anderson | |
| 6,397,549 B1 * | 6/2002 | Baldwin | E04B 2/42 52/422 |
| 7,117,647 B2 * | 10/2006 | Clarke | E04B 2/702 52/233 |
| 8,789,325 B2 * | 7/2014 | Verhaeghe | E04B 2/08 52/233 |
| 10,415,241 B2 * | 9/2019 | Simonson | E04B 2/32 |
| 2006/0156656 A1 * | 7/2006 | Robinson | E04B 2/16 52/220.2 |
| 2009/0151292 A1 * | 6/2009 | Sinclair, Sr. | E04B 2/02 106/674 |
| 2020/0063981 A1 | 2/2020 | Alsberg | |

* cited by examiner

*Primary Examiner* — Jessica L Laux
(74) *Attorney, Agent, or Firm* — B. Craig Killough (57) ABSTRACT

A wall construction formed of solid wood members. The wall construction provides for a heating and cooling system that synergistically works with the inherent insulative properties of solid wood members. The wall construction comprises channels formed in the solid wood members to accommodate conduits for heating and cooling. The conduits are routed through multiple solid wood members of a wall and are positioned to efficiently heat and cool the interior of a building. Other grooves may be formed in the top side of the solid wood members to accommodate conduits for heating, cooling electrical service and communications carriers.

12 Claims, 7 Drawing Sheets

SOLID WOOD WALL SYSTEM

BACKGROUND OF THE INVENTION

Advantages of solid wood wall systems for fabricating buildings include low and simple maintenance, noise reduction, and energy efficiency. Wood is a renewable resource, making solid wood wall buildings cabins environmentally friendly. Framing of solid wood wall buildings cabins can be performed quickly and efficiently by stacking the solid wood members.

However, many people do not like the aesthetics of solid wood wall buildings such as log cabins as compared to more traditional "stick built" houses that use framing materials combined with siding made of various materials. Some homeowners' associations do not allow solid wood wall buildings cabins to be constructed within their governance area.

There is a need for wall construction formed of solid wood that overcomes the aesthetic objections to while taking advantage of the benefits of solid wood member construction.

SUMMARY OF THE INVENTION

The present invention is a wall construction formed of solid wood. The wall construction provides for a heating and cooling system that synergistically works with the inherent insulative properties of solid wood for construction that is thermally efficient and energy saving. The wall presents itself as traditional wood siding in some embodiments.

The solid wood wall system of the invention construction comprises channels formed in the solid wood wall to accommodate conduits for heating and cooling. The conduits are routed through multiple solid wood members of a wall and are positioned to efficiently heat and cool the interior of a building.

The solid wood members forming the wall system may be formed to have a first vertical side and a lower side that joins the first vertical side at substantially a right angle. The lower side has one or more grooves formed in it. A second vertical side may join the lower side at a generally acute angle in one embodiment, and is present on an exterior of a building to simulate lap siding. A top side of the solid wood member joins the first vertical side and joins the second vertical side. The top side has one or more tongues that are constructed and arranged to engage one or more grooves formed in lower surface of an adjoining solid wood member. Other grooves may be formed in the top side of the solid wood member to accommodate conduits for heating, cooling electrical service and communications carriers. Curved grooves are formed in corners to accommodate routing of conduits through multiple solid wood members.

DESCRIPTION OF PREFERRED EMBODIMENTS

The term "solid wood member" as used herein means an elongated, unitary wooden member typically formed from the main axis of a tree. The width and height of a solid wood member as used in the invention are each not less than 5.5 inches (14 cm). The definition of solid wood member does not include planks or boards, that is, wood pieces that are generally flat with faces that are substantially greater in one dimension than in an adjoining dimension, such as boards that are used for forming siding for buildings or for framing studs. Finished solid wood members as used in construction methods described herein may be formed by planer machinery to the desired profile.

Figure 1:
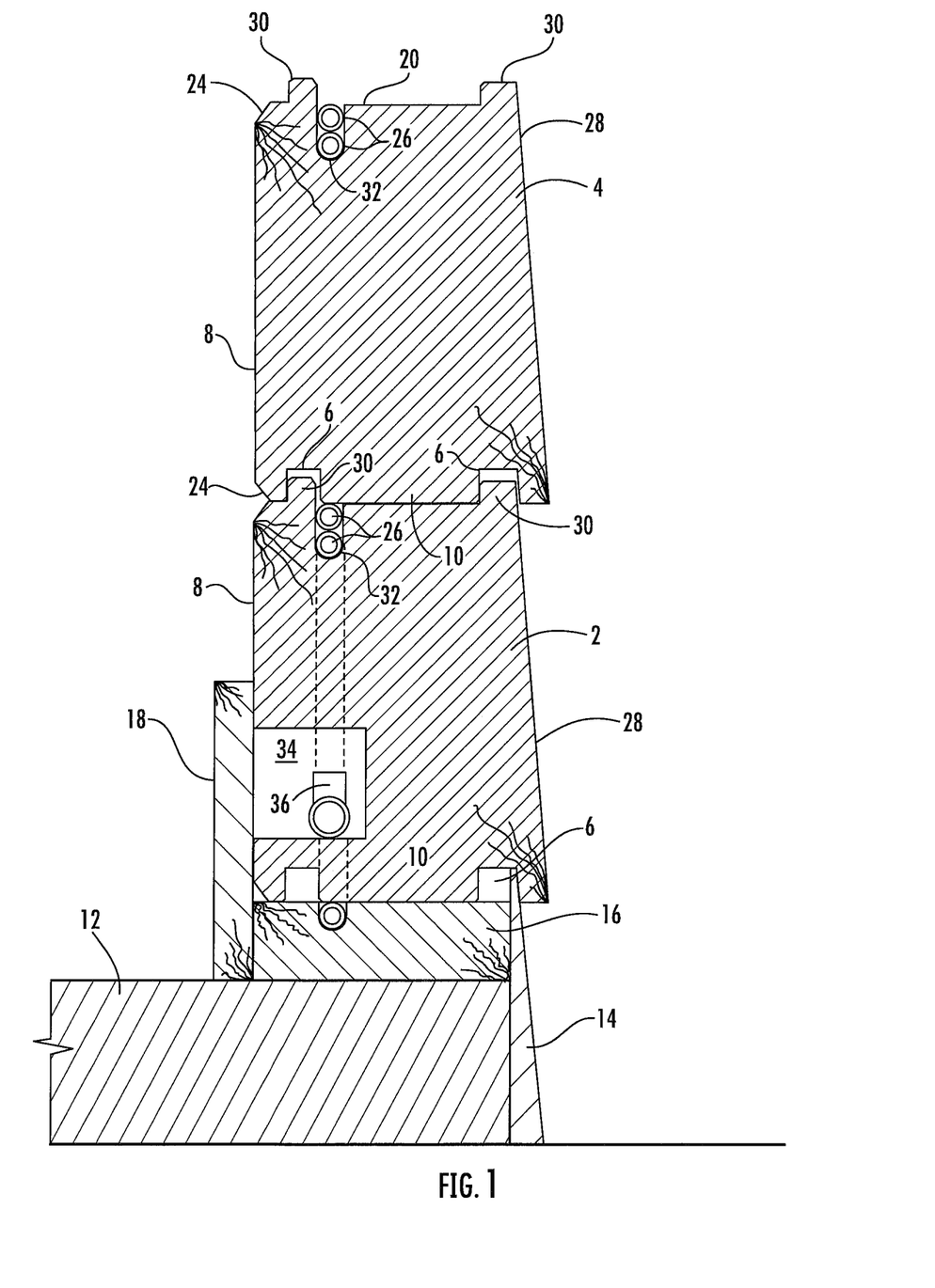
FIG. 1 is a section side elevation of a wall construction according to an embodiment of the invention.

FIG. 1 shows a partial wall according to an embodiment of the invention. The left side of the drawing is an interior wall of a building structure, and the right side of the drawing demonstrates an exterior wall of the building structure using the wall construction of the invention. The wall is constructed over a foundation 12, which may be a concrete slab in one embodiment or it may be other known foundation constructs. The foundation may be covered on an exterior wall by a covering 14, which may be wood, concrete siding, vinyl or other materials. A base member 16 or shoe may be positioned over the slab, which may be formed of wood.

In one embodiment, a first solid wood member 2 is positioned over the base member 16, and successive solid wood members 4 are stacked over the base member and other solid wood members as demonstrated by FIG. 1. The number of solid wood members to be used depends upon the desired height of the wall being constructed. A baseboard 18 or other trim may be used on the interior wall formed by the solid wood members.

The top solid wood member 4 as shown in the embodiment of FIG. 1 is characterized by a plurality of grooves formed 6 in the lower side or bottom surface of the solid wood member. Vertical sides 8 of the solid wood members that form the interior wall may join the lower sides 10 at generally a right angle, but may have an angle 24 formed where the first vertical side forms the lower side.

The first vertical side 8 joins the top side 20 or upper side of the solid wood member at generally a right angle, and again, may have an angle 24 formed where the first vertical side joins the top side. The top side is characterized by a plurality of tongues 30 formed therein, which as shown, is two tongues. In this embodiment, one tongue is offset from the interior wall, while the second tongue extends from and forms part of the second wall 28. One or more grooves 32 are formed in the top side of the solid wood member.

The groove 32 formed in the top side 20 of the solid wood member 2 is used to accommodate one or more conduits 26. The conduits may be formed of suitable material, such as polyvinyl chloride (PVC), or more preferably, PEX.™ PEX is preferred due to demonstrated durability and flexibility in carrying heated and cooled liquids. The conduits carry heated or cooled water for heating and cooling a building formed by the solid wood wall system. Conduits may carry electrical service or communications service in some cases. The groove formed in the top side is preferred to be positioned within the first (¼) quarter of the width of the solid wood member when measured from the interior wall 8. Placing the conduit carrying heated and cooled water near the interior wall provides superior thermal benefits for the interior of the building.

Figure 5:
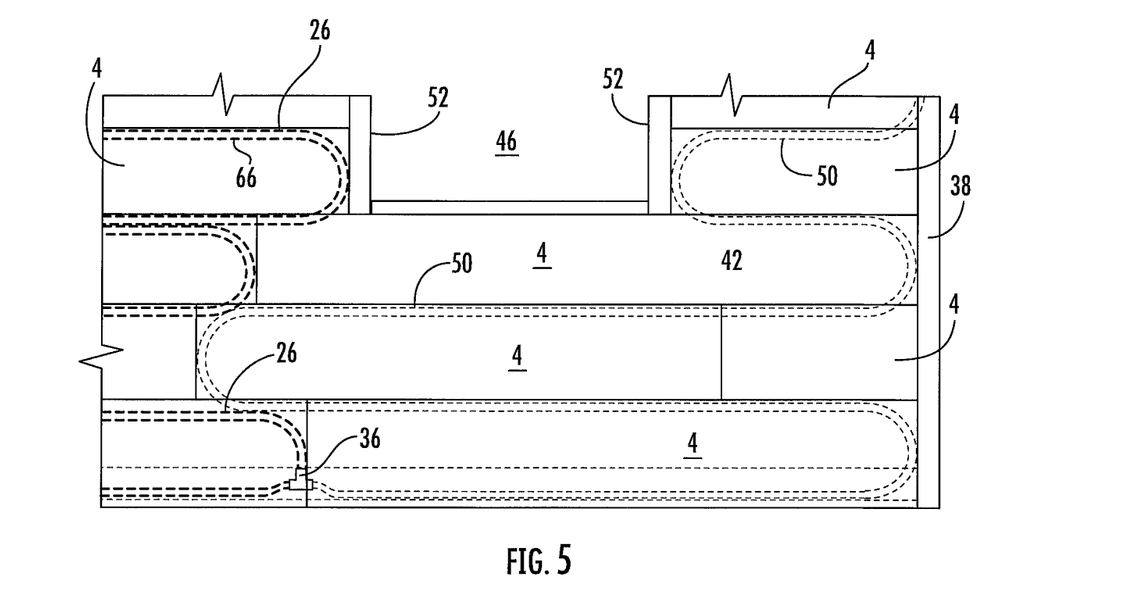
FIG. 5 is an elevation of a wall construction according to an embodiment of the invention, showing routing of conduit according to an embodiment of the invention in dotted lines.

Additional solid wood members constructed like solid wood member 4 may be positioned on top of each other to increase the height of the solid wood wall. FIG. 5. While the solid wood members used may be substantially the same construct as the top or upper solid wood member, the length of the solid wood members may be varied as required, so as to provide for window openings, door openings or other openings or needs according to the design of the building. The solid wood members are preferred to have a tongue and groove construct such as that shown in FIG. 1. A sealant or sealing material 42 may be positioned between the solid wood members. Elastomeric materials such as butyl may be used as a sealant.

The lower solid wood member 2 as shown in the embodiment of FIG. 1 is substantially identical to the upper solid wood member 4. However, the lower solid wood member has an increased longitudinal opening 34 formed therein so that various service can be provided through the opening. The opening can provide for conduits for heating and cooling, electrical service and communications. Adequate space is available for positioning splitters or valves 36 for diverting fluids used in heating and cooling to other thermal circuits.

Figure 2:
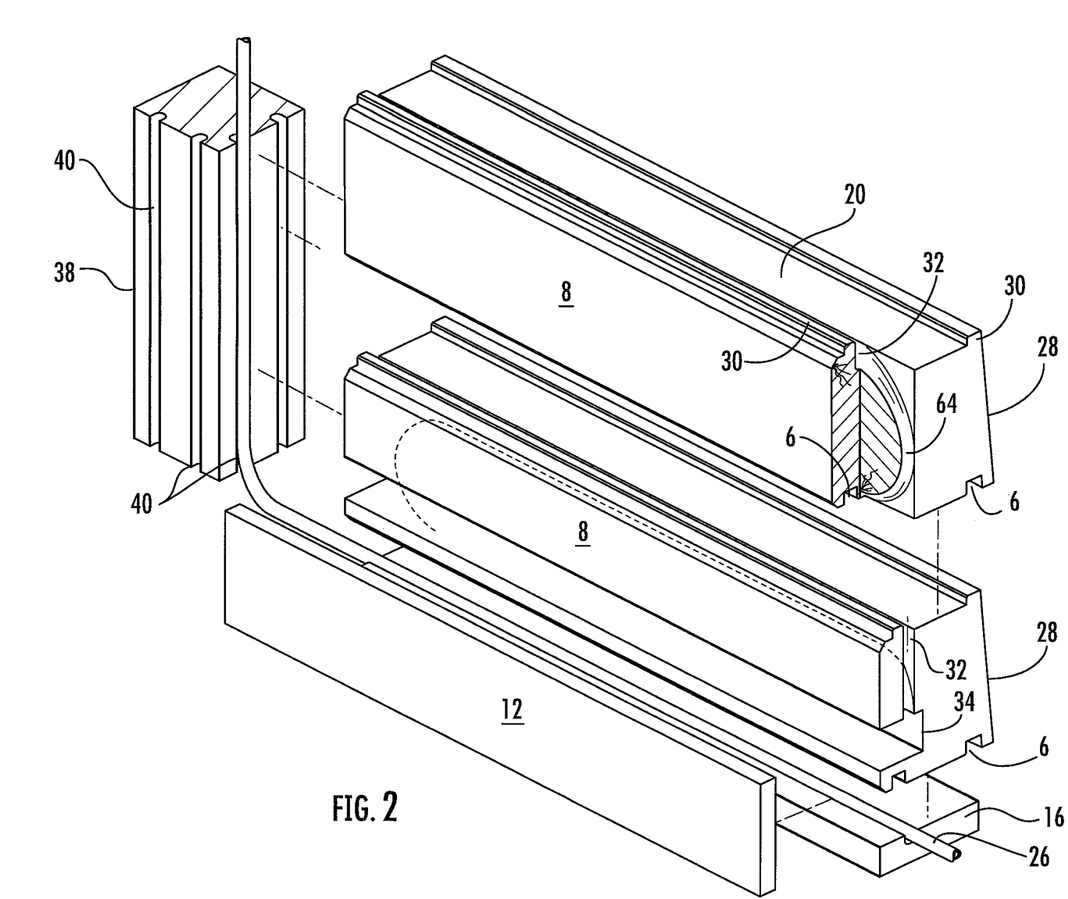
FIG. 2 is an exploded, perspective view of exemplary elements of a wall construction according to the invention.

An embodiment of the invention provides for routing conduit 26 at the end of one solid wood member to an adjoining solid wood member. The preferred conduit for the invention is PEX™. A radiused or arcuate groove formed therein at an end of the solid wood members accommodates turning the PEX™ for continuation of the conduit into adjoining solid wood members, which is referred to as a thermal channel. PEX™ can typically be turned in a radius of six to eight inches depending upon the construct and size of PEX™ that is used. Accordingly, radiused or arcuate cuts 64 are formed near an end of each solid wood member as a thermal channel to accommodate the curve of the PEX™ and turn the conduit, such as PEX, 180°. FIG. 2; FIG. 5.

Figure 3:
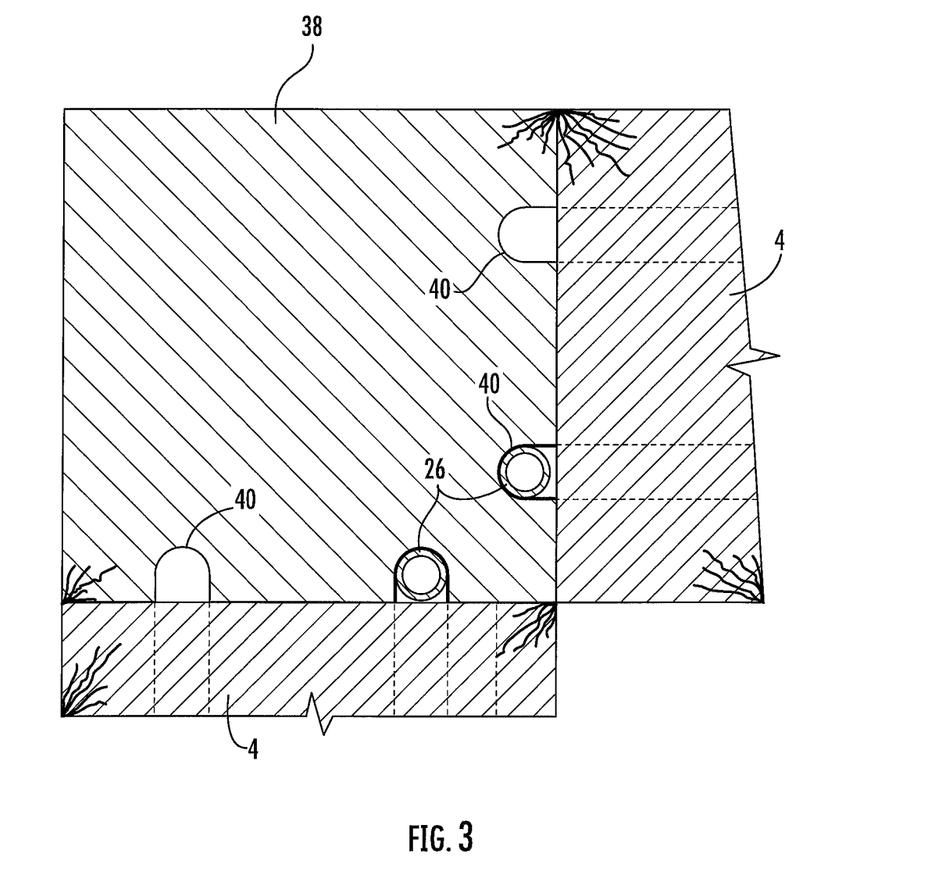
FIG. 3 is a sectioned, top view of a corner post with wall forming member joining the corner post.

As shown in FIG. 3, the end or corner post 38 is preferred to have two grooves 40 formed in each of adjoining sides of the corner posts. The conduit 26, such as PEX™, intersects the groove that is closest to the interior of the building structure. In the example of FIG. 3, the interior walls of the building in which the invention is used are the walls where two solid wood members 4 come together at the corner post to form a ninety degree angle. The conduit is positioned in the groove closest to the interior of the structure as shown. In a preferred embodiment, the opposite conduit is filled with foam if not used for positioning conduit. The foam material or other filler material may improve thermal and sound insulation. The corner post is more universal in its application if two grooves are formed rather than one groove formed in each adjoining side.

Figure 4:
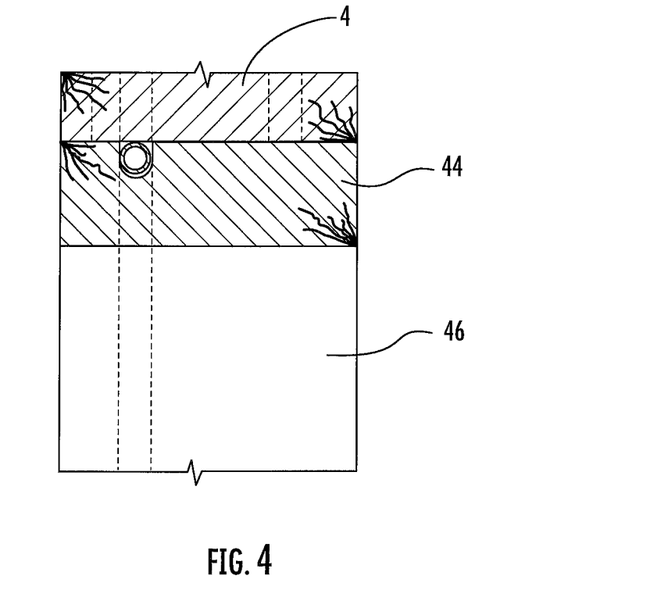
FIG. 4 is an elevation of a top plate of a window constructed according to an embodiment of the invention.

FIG. 4 shows a top plate 44 for a window opening 46. A solid wood member 4 is positioned over the top plate. The top plate may be a two (2") inch by six (6") inch board. The top plate may have a groove 48 formed therein for receiving a conduit 36, such as a PEX™ conduit, used as described herein.

FIG. 5 shows an elevation of a partial wall structure according to an embodiment of the invention. Solid wood members 4 are stacked on top of each other, with the solid wood members structured as shown in FIG. 1. A base plate 16 may be used and positioned over foundation 12. FIG. 5 shows an example of a window opening 46 formed in the wall. The solid wood members have the radiused or arcuate thermal channel formed in the ends as described. The window jambs may, for example, be formed by two (2") inch by six (6") inch boards similar to the board shown in FIG. 4, excepting that the two by six boards are positioned vertically rather than horizontally.

In a preferred embodiment, heated or chilled fluid such as water is pushed through the conduit 26 in the wall structure from the top down toward the base plate 16 or shoe of the wall structure. The fluid is pushed from conduit in the base plate or shoe though thermal circuits 50,66 toward the top of the wall structure. Water return may be provided in one example through the corner post 38. The opening 34 in the bottom or lower solid wood members 2 is of sufficient size to house a valve 36 or T junction that channels water into an additional conduit circuit 50 as shown in FIG. 5.

Figure 6:
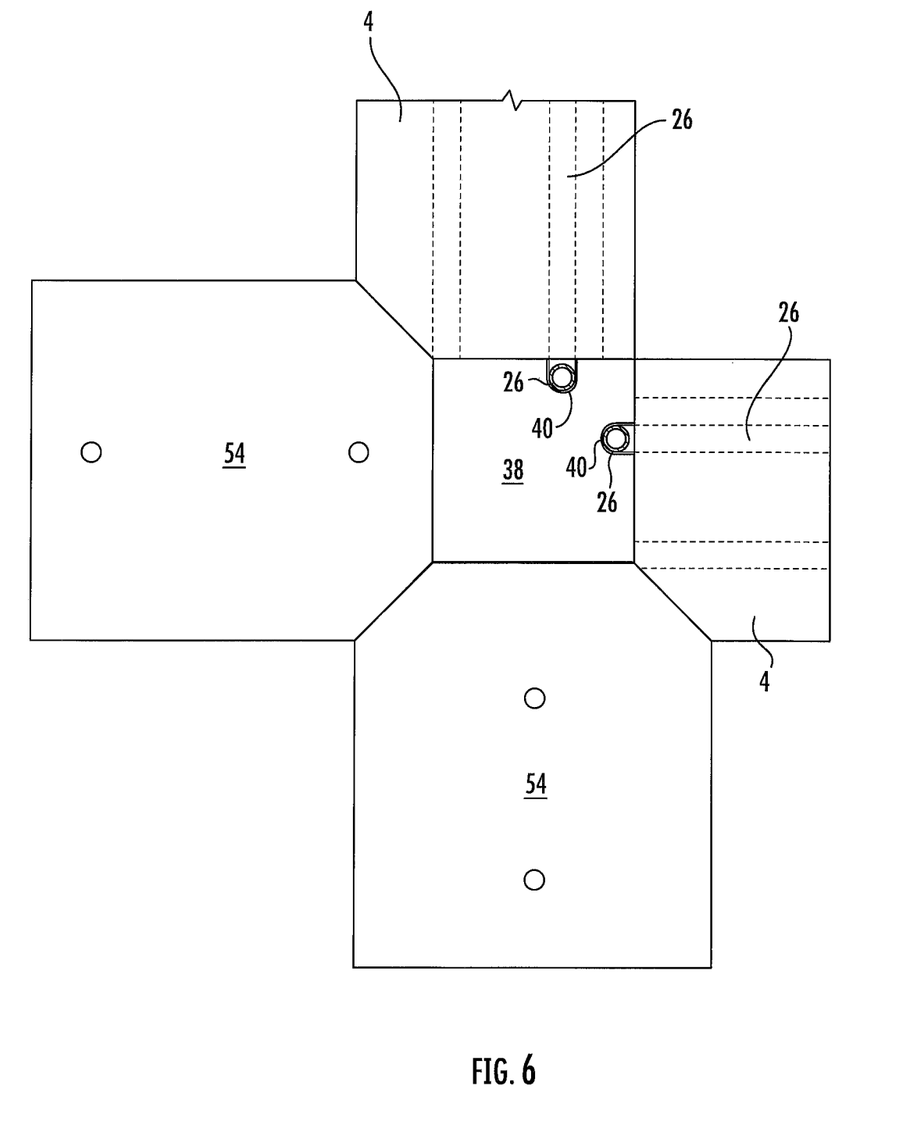
FIG. 6 is a top plan view of a corner post with adjoining walls and having exterior ornamentation of a traditional log cabin structure.

FIG. 6 shows end caps 54 that may be used in conjunction with corner posts 38 for a first embodiment of a decorative look. In this embodiment, the end caps simulate the traditional ends of logs used in log cabin construction.

Figure 7:
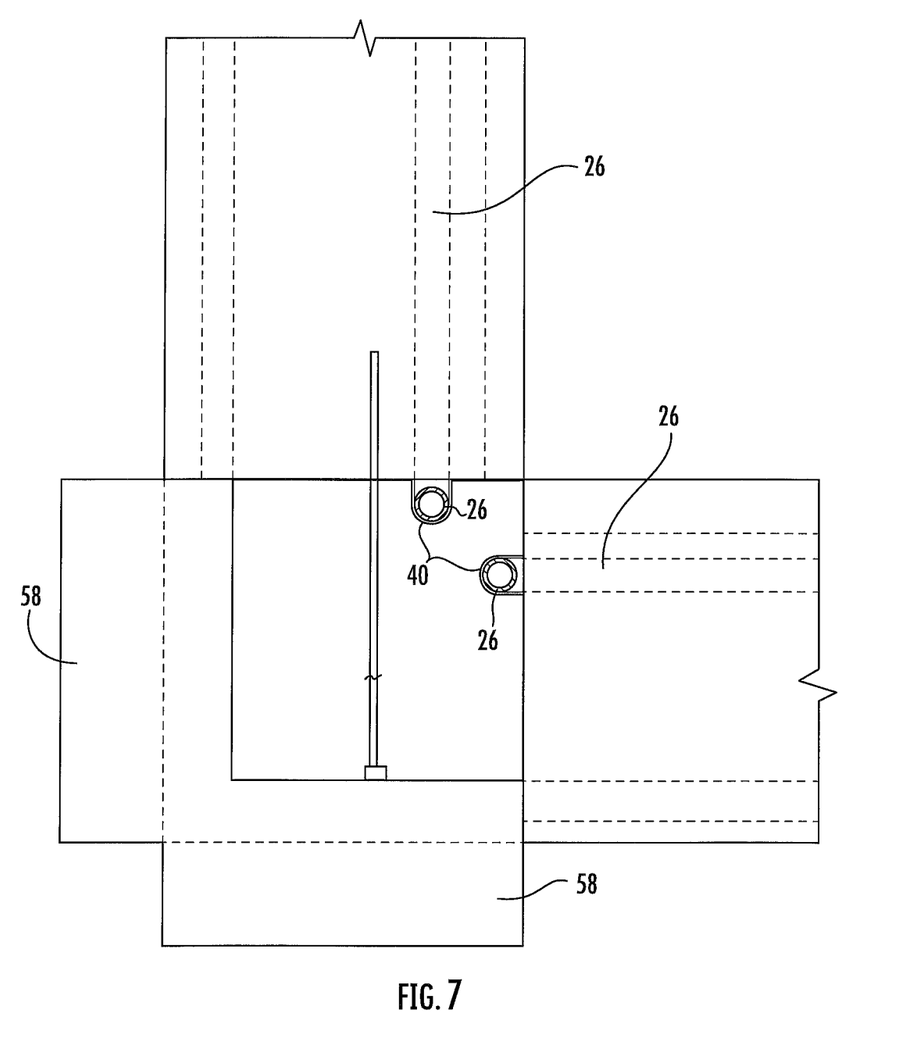
FIG. 7 is a top plan view of a corner post with adjoining walls and having exterior ornamentation with dove tails on the corners.

FIG. 7 demonstrates a fastener 56 that connects a solid wood member 4 to the end post 38. Dovetail corners 58 are provided that cover the end post in this embodiment.

Figure 8:
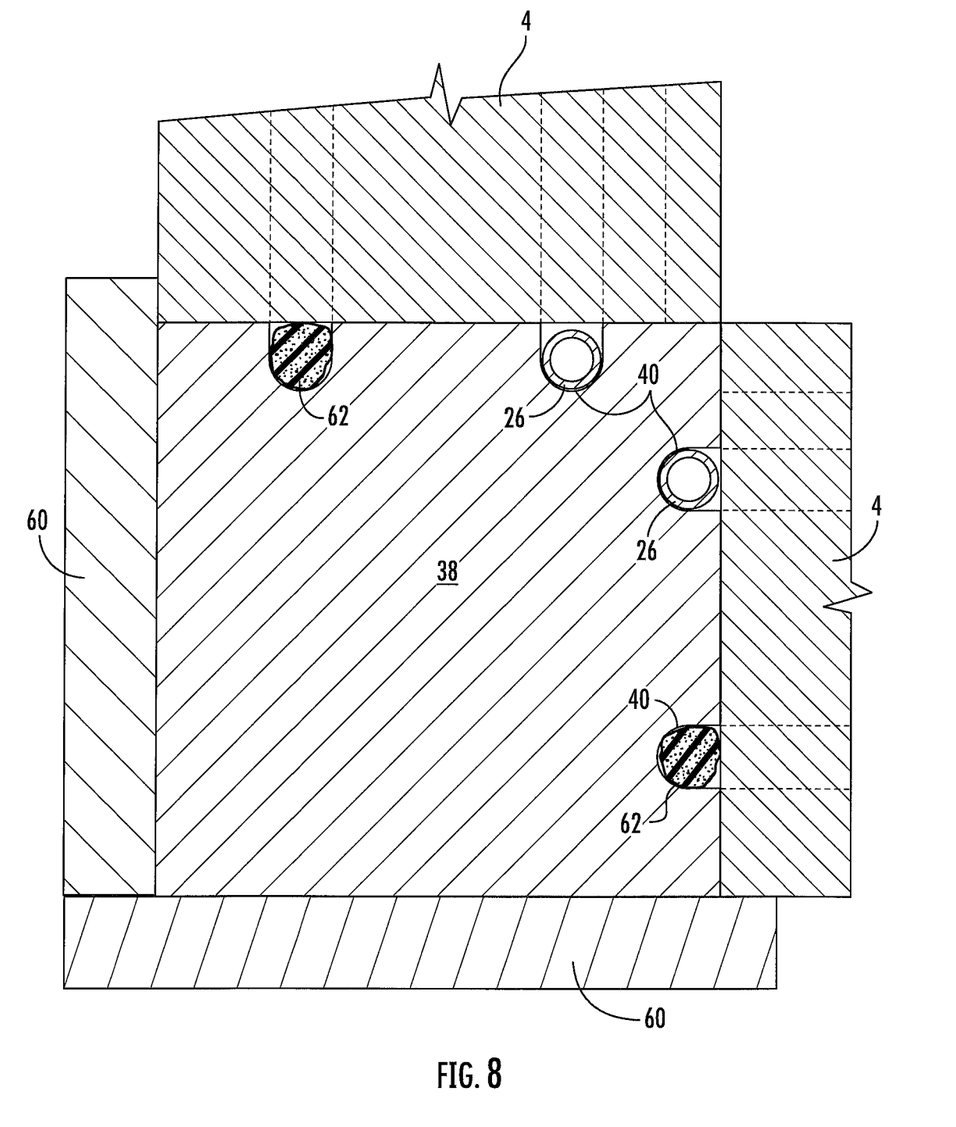
FIG. 8 is a top plan view of a corner post with adjoining walls and having exterior ornamentation as is typical for a lap siding house.

FIG. 8 shows another embodiment of an end post 38 that may be used with, for example, the lap siding embodiment, with the sides of the end post covered by end coverings 60. As shown, the end post has PEX™ conduit closest to the interior wall of the structure, with the end coverings closer to the outer wall of the structure. The grooves 40 in the end post that do not have PEX™ conduit therein 26 are foam 62 filled as described previously. Ends of solid wood members 4 are connected to the corner posts, such as by fasteners, which may be nails or lag screws or other fasteners suitable for joining large wooden members. The end coverings hide the fasteners.

As shown in FIG. 2, conduit 26 may be routed from above the solid wood wall system through the groove 40 of the corner post 38. The conduit may then be routed into a groove shown in the shoe or base member 16. Moving to FIG. 5, a splitter or valve 36 may be used to create an additional thermal channel circuit 50. Conduit routing is continued upwardly through successive solid wood members 4, and is positioned in the elongated channels or grooves 32 formed in the upper portion of the elongated solid wood members. Near an end of a solid wood member, the conduit transitions to the solid wood member above it, with the conduit positioned through the arcuate groove 64 formed in the solid wood member, which turns the conduit 180°. The conduit is then positioned in the elongated groove of the solid wood member, and then into the arcuate groove near the end of the solid wood member that is next positioned above, which turns the conduit 180° in the opposite direction. This positioning of the conduit is repeated from solid wood member to adjoining solid wood member to form the solid wood wall system as shown in FIG. 5. The end of the solid wood member in which the arcuate groove is positioned alternates from solid wood member to solid wood member as shown. However, the arcuate grooves and the elongated grooves are near to the interior surface of the elongated wood members for optimal thermal transfer from the solid wood wall to the interior of the building. FIG. 1. The fluid traversing the conduit is ultimately returned to its thermal source for additional heating or cooling, with the return typically at the top of the wall formed by the solid wood wall systems.

The resulting wall system formed of solid wood members according to the invention is resistant to high wind loads and earthquakes due to the use of the relatively heavy solid wood members and the fact that the solid wood members provide both the exterior siding and structural support. Solid wood members are resistant to substantial mechanical loading from high winds or earthquakes as compared to structures formed of wooden or metal studs that are joined to other studs or construction methods that present multiple joints that are subject to breaking. Assembling a wall as disclosed herein can be accomplished primarily by stacking pre-formed solid wood members on a foundation and routing conduit for interior heating and cooling. Assembly on-site may be accomplished quickly and economically.

What is claimed:

1. A solid wood wall having a conduit therein, comprising:
   an elongated solid wood member, the elongated solid wood member comprising an elongated groove formed along a length of a surface of the elongated solid wood member, and an arcuate groove formed at an end of the elongated solid wood member and within an interior of the elongated solid wood member that is between an outer surface of the elongated solid wood member and an inner surface of the elongated solid wood member, the elongated groove intersecting the arcuate groove at an end of the arcuate groove, the arcuate groove formed as a curve that extends from a lower surface of the elongated solid wood member at one end of the arcuate groove to an upper surface of the elongated solid wood member at a second end of the arcuate groove;
   a heating and cooling conduit that is positioned within and is shaped by the elongated groove and the arcuate groove;
   wherein the curve of the arcuate groove turns the heating and cooling conduit 180 degrees from the lower surface of the elongated solid wood member to the upper surface of the elongated solid wood member.

2. A solid wood wall having a conduit therein as described in claim 1, wherein the arcuate groove is shaped as a half circle.

3. A solid wood wall having a conduit therein as described in claim 1, wherein the arcuate groove is constructed and arranged to intersect an elongated groove formed along a length of a surface of a second elongated solid wood member and receive the heating and cooling conduit into the arcuate groove.

4. A solid wood wall having a conduit therein as described in claim 3, wherein the arcuate groove is shaped as a half circle.

5. A solid wood wall having a conduit therein as described in claim 3, wherein the heating and cooling conduit comprises heated water moving through the heating and cooling conduit and heating the elongated solid wood member and the second elongated solid wood member.

6. A solid wood wall having a conduit therein as described in claim 3, wherein the heating and cooling conduit comprises cooled water moving through the heating and cooling conduit and cooling the elongated solid wood member and the second elongated solid wood member.

7. A solid wood wall having a conduit therein as described in claim 3, wherein the arcuate groove of the elongated solid wood member intersects the elongated groove of the second solid wood member and the heating and cooling conduit extends from the elongated groove of the second elongated solid wood member and into the arcuate groove of the elongated solid wood member.

8. A solid wood wall having a conduit therein as described in claim 1, comprising a second elongated solid wood member, the second elongated solid wood member comprising an elongated groove formed along a length of a surface of the second elongated solid wood member, and an arcuate groove formed at an end of the second elongated solid wood member between an outer surface of the elongated solid wood member and an inner surface of the elongated solid wood member, the elongated groove of the second elongated solid wood member intersecting the arcuate groove of the second elongated solid wood member at an end of the arcuate groove of the second elongated solid wood member, the arcuate groove of the second elongated solid wood member formed as a curve that extends from a lower surface of the second elongated solid wood member at one end of the arcuate groove of the second elongated solid wood member to an upper surface of the second elongated solid wood member at a second end of the arcuate groove of the second elongated solid wood member;
   the heating and cooling conduit that is positioned within and is shaped by the elongated groove of the second elongated solid wood member and the arcuate groove of the second elongated solid wood member;
   wherein the curve of the arcuate groove of the second elongated solid wood member turns the heating and cooling conduit 180 degrees from the lower surface of the second elongated solid wood member to the upper surface of the second elongated solid wood member, and the heating and cooling conduit continues to the arcuate groove and the elongated groove of the elongated solid wood member.

9. A solid wood wall having a conduit therein as described in claim 1, wherein the heating and cooling conduit comprises heated water moving through the heating and cooling conduit and heating the elongated solid wood member.

10. A solid wood wall having a conduit therein as described in claim 1, wherein the heating and cooling conduit comprises cooled water moving through the heating and cooling conduit and cooling the elongated solid wood member.

11. A solid wood wall having a conduit therein as described in claim 1, wherein the heating and cooling conduit is a flexible conduit.

12. A solid wood wall having a conduit therein as described in claim 1, wherein the heating and cooling conduit is formed of cross-linked polyethylene (PEX).

* * * * *